United States Patent [19]
Elizondo

[11] Patent Number: 5,921,504
[45] Date of Patent: Jul. 13, 1999

[54] AIRCRAFT PASSENGER EXTRACTION SYSTEM

[76] Inventor: Joey P. Elizondo, 6507 Cherrydale Dr., Houston, Tex. 77087

[21] Appl. No.: 09/063,230

[22] Filed: Apr. 21, 1998

Related U.S. Application Data

[60] Provisional application No. 60/054,954, Aug. 17, 1997.

[51] Int. Cl.$^6$ ........................................................ B64C 1/32
[52] U.S. Cl. ............................ 244/140; 244/147; 244/120
[58] Field of Search ................................ 244/138 R, 140, 244/139, 147, 110 D, 113, 120

[56] References Cited

U.S. PATENT DOCUMENTS

| | | | |
|---|---|---|---|
| 2,441,913 | 5/1948 | Taylor | 244/118.2 |
| 2,684,219 | 7/1954 | Thunbo . | |
| 2,941,764 | 6/1960 | Lee, Jr. et al. | 244/140 |
| 3,508,727 | 4/1970 | Willems | 244/140 |
| 4,699,336 | 10/1987 | Diamond . | |
| 5,110,071 | 5/1992 | Hunter et al. . | |
| 5,356,097 | 10/1994 | Chalupa . | |

FOREIGN PATENT DOCUMENTS

| | | | |
|---|---|---|---|
| 806222 | 12/1936 | France | 244/140 |
| 1051874 | 1/1954 | France . | |
| 1388345 | 3/1964 | France . | |
| 580446 | 6/1944 | United Kingdom . | |
| 1086697 | 10/1967 | United Kingdom | 244/140 |

*Primary Examiner*—Galen L. Barefoot
*Attorney, Agent, or Firm*—Richard C. Litman

[57] ABSTRACT

An aircraft passenger extraction system having a fuselage and a tail section removably attached to the fuselage. A plurality of interconnected passenger modules are removably disposed within the fuselage. Four I-beam rails are longitudinally mounted about the inside circumference of the fuselage, and the passenger modules have four sets of wheels that slide on the rails. The tail section has four pairs of separation flaps and four extraction flaps to assist in the separation of the tail section in the event of an airborne emergency. Upon separation of the tail section of the fuselage, the interconnected passenger modules are slidingly withdrawn from the fuselage. Once the passenger modules clear the fuselage, the interconnections of each passenger module are severed in sequence, and a series of parachutes are deployed to safely float each passenger compartment to earth.

6 Claims, 4 Drawing Sheets

AIRCRAFT PASSENGER EXTRACTION SYSTEM

CROSS-REFERENCE TO RELATED APPLICATION

This application claims the benefit of U.S. Provisional Patent Application Serial No. 60/054,954, filed Aug. 7, 1997.

BACKGROUND OF THE INVENTION

1. Field of the Invention

The present invention relates to aircraft safety improvements, and more particularly, the invention relates to an aircraft with a plurality of passenger modules which may be extracted from the aircraft in an emergency and safely return passengers and crew to earth.

2. Description of Related Art

Since the advent of flight, individuals have struggled to develop technology to prevent fatalities encountered in air travel. Such fatalities frequently occur when control of an aircraft is lost due to mechanical failure or pilot error, sending the aircraft careening to earth and killing most, if not all, passengers and crew aboard. These casualties can be avoided if a device capable of extracting the individuals from a crashing airborne aircraft was to be developed.

Aircraft with passenger extraction means are known in the related art. U.S. Pat. No. 2,684,219 which issued to M.Ø. Thunbo on Jul. 20, 1954 discloses an aircraft with a detachable cabin. The cabin is housed within the fuselage and is equipped with a parachute to enable the safe landing of the cabin. The fuselage has guide wheels to allow the cabin to slide away from the fuselage and out of danger. To operate this device, the pilot must enter the cabin, seal the door shut, and release the cabin, a time-consuming process.

U.S. Pat. No. 4,699,336 which issued to P. Diamond on Oct. 13, 1987 discloses an airplane safety body passenger compartment containing a mechanism for ejecting the passenger compartment from the fuselage when the aircraft is in danger of crashing. Parachutes then float the passenger compartment to earth.

U.S. Pat. No. 5,110,071 which issued to Hunter et al. on May 5, 1992, discloses a personnel capsule extraction apparatus comprising a personnel capsule mounted on an extraction platform which is ejected from a low-flying aircraft. This invention cannot be used at high altitudes, where many airborne emergencies arise.

U.S. Pat. No. 5,356,097 which issued to S. Chalupa on Oct. 18, 1994, discloses a segmented safety aircraft comprising a plurality of segmented passenger cabins and a fuselage base support. In the event of an airborne emergency, a rocket causes the segment nearest the tail section to discharge, each subsequent segment is connected to the tail segment by connecting cables so that the tail segment then pulls the remaining segments away from the fuselage base support. Parachutes then safely bring the segments to earth, and airbags on the underside of the cabins cushion the landing of the cabins and provide for their floatation.

Similarly, French Patent No. 1,051,874 which issued to I. Zafra and was published on Jan. 19, 1954, discloses an aircraft having a detachable passenger cabin. Upon the detachment of the cabin, a parachute deploys to safely bring the cabin to earth. Additionally, French Patent No. 1,388,345 which issued to D. Laiber and was applied for on Mar. 14, 1964, discloses an aircraft having a plurality of detachable compartments that are deployable in the event of an emergency.

British Patent No. 580,446 which was issued to S. Mazurek and was applied for on Jun. 21, 1944, and British Patent No. 1,086,697 which issued to A. P. Pedrick and was published on Oct. 11, 1967, both disclose an aircraft with detachable cabins that separate in the event of an airborne emergency, and slowly descend to earth with a parachute.

None of the above inventions and patents, taken either singly or in combination, is seen to describe the instant invention as claimed.

SUMMARY OF THE INVENTION

The present invention is a aircraft passenger extraction system having a fuselage, a cockpit section, and a tail section removably attached to the fuselage. A plurality of interconnected passenger modules for accommodating passengers is removably disposed within the fuselage. Each passenger module is equipped with a floatation device for aquatic landings, food and water provisions, a homing device, a first-aid kit, a two-way radio, smoke ventilation means and a fire extinguisher. Passengers are contained while seated inside the passenger modules in a manner similar to that of a conventional airplane.

Four I-beam rails are longitudinally mounted about the inside circumference of the fuselage, and the passenger modules have four sets of wheels that slide on the rails. The tail section has a wind diffuser, four pairs of separation flaps and four extraction flaps to assist in the separation of the tail section in the event of an airborne emergency. Upon separation of the tail section of the fuselage, the interconnected passenger modules are slidingly withdrawn from the fuselage. Once all passenger modules clear the fuselage, a firing pin detonates to sequentially sever the interconnections of each passenger module, and a series of parachutes are deployed to safely float each passenger compartment to earth.

Accordingly, it is a principal object of the invention to provide an aircraft passenger extraction system with a plurality of removable passenger modules for safely returning aircraft passengers to earth in the event of an airborne emergency.

It is another object of the invention to provide an aircraft passenger extraction system that may be easily adapted for use with a preexisting plane fuselage.

It is a further object of the invention to provide an aircraft passenger extraction system that is simple and easy to use.

It is an object of the invention to provide improved elements and arrangements thereof in an apparatus for the purposes described which is safe, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
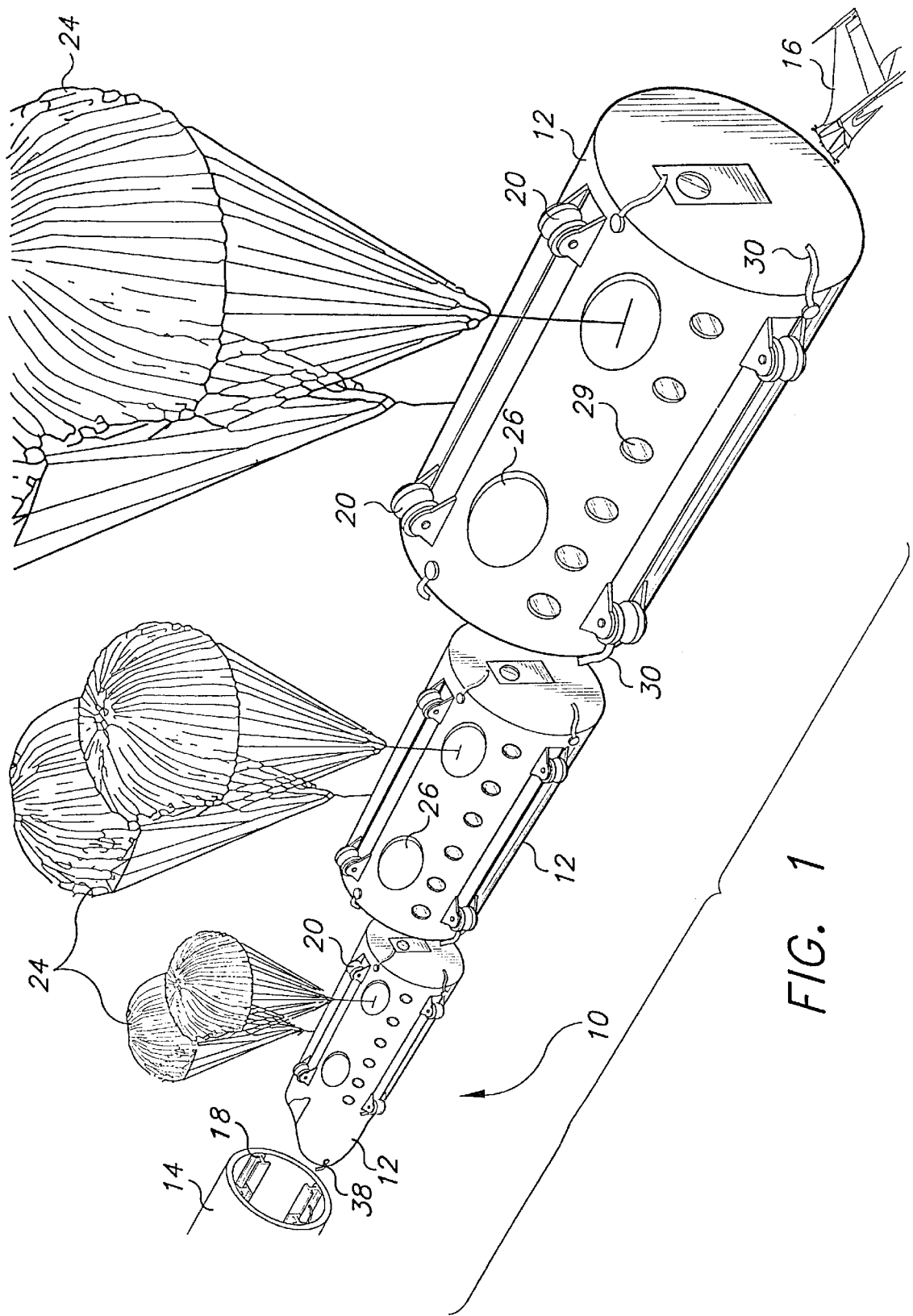
FIG. 1 is an environmental perspective view of the aircraft passenger extraction system of the present invention in use in conjunction with an airplane, in the final deployment stage, showing the tail section and passenger modules falling to earth.

Referring now to the drawings wherein like numerals identify like elements, FIG. 1 is a perspective view of the aircraft passenger extraction system 10 of the present invention. The aircraft passenger extraction system 10 is intended to be used in conjunction with a commercial passenger airplane, and therefore configured to be adapted to one, although the system may be employed in conjunction with other types of known aircraft. The aircraft 10 comprises a generally cylindrical fuselage 14 having a cockpit section (not shown) on one end and permanently connected to the fuselage, and a generally cylindrical removable tail section 16. Longitudinally present along the inside of the fuselage are four I-beam guide rails 18. The guide rails 18 are equidistantly disposed about the inner circumference of the fuselage 14, and are preferably comprised of titanium, but may be comprised of other material in alternative embodiments. Additionally, the guide rails 18 provide structural support to the fuselage 14.

A plurality of passenger modules 12 are disposed within the fuselage 14, the inside of each module being configured similar to the cabin of a standard aircraft, with passengers sitting in rows. The modules 12 are ideally comprised of aluminum and kevlar, but may be comprised of other materials in alternative embodiments. Additionally, windows 29 are provided in each module 12.

Four sets of guide wheels 20 are mounted longitudinally about the passenger module 12, each set of guide wheels being equidistantly disposed about the circumference of the passenger module. Each set of guide wheels 20 additionally engages in registry with a respective guide rail 18, enabling movement of each set of guide wheels along a respective guide rail. The guide wheels are ideally comprised of aluminum and titanium, but may be comprised of other materials in alternative embodiments.

In the event a rail 18 is damaged during an airborne emergency and obstructs the engagement of a wheel 20 with the rail, the obstructed set of guide wheels 20 is designed to detach to permit the hull of the passenger compartment 12 to continue exiting the fuselage uninhibited by the damaged rail. Additionally, In the event that one or more of the rails 18 is damaged in an airborne emergency, the remaining rails may still provide for controlled release of the modules 12 from the fuselage 14.

Figure 2:
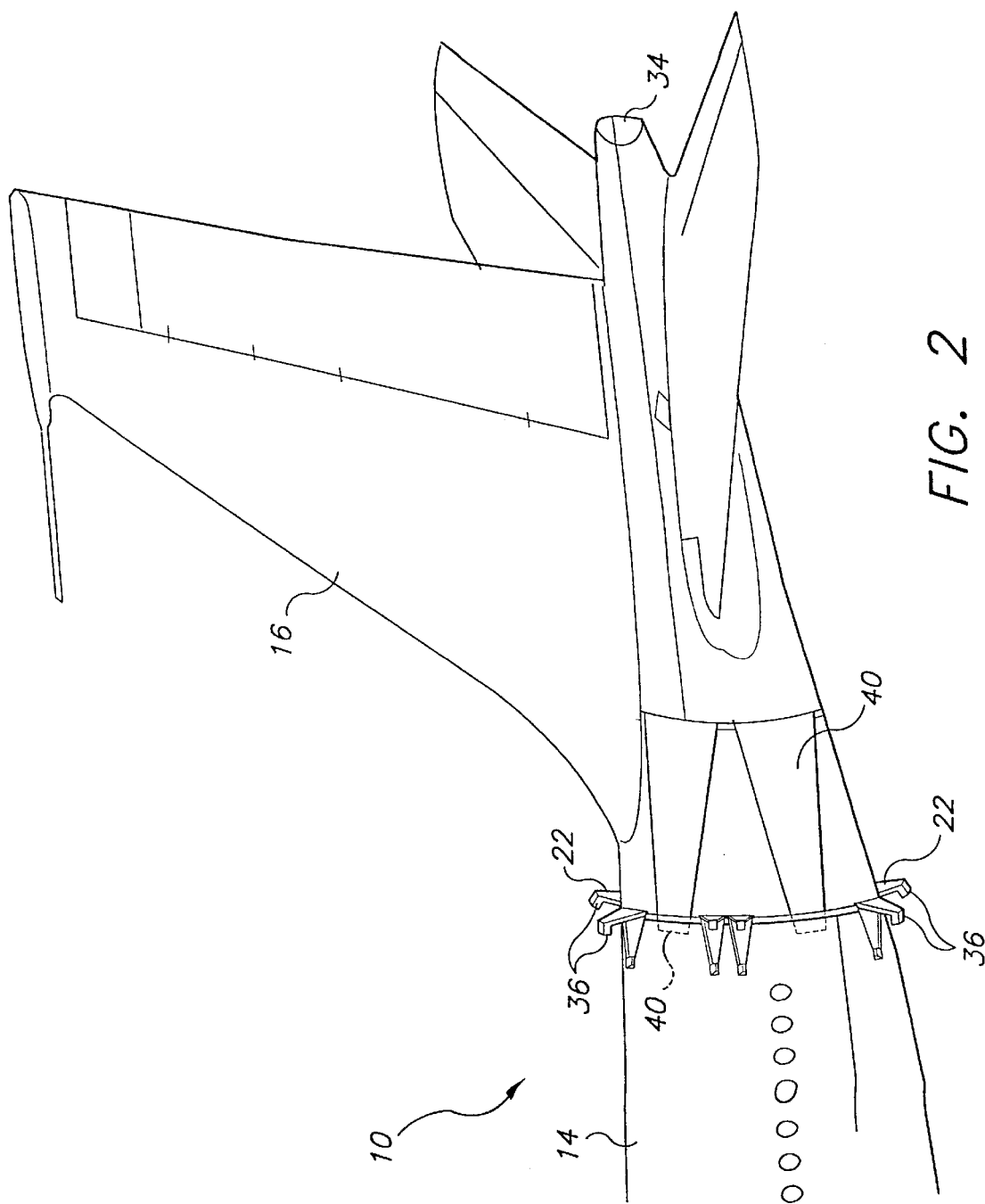
FIG. 2 is an environmental perspective view of the present invention in the initial deployment stage, showing the separation flaps released from the fuselage.
Figure 3:
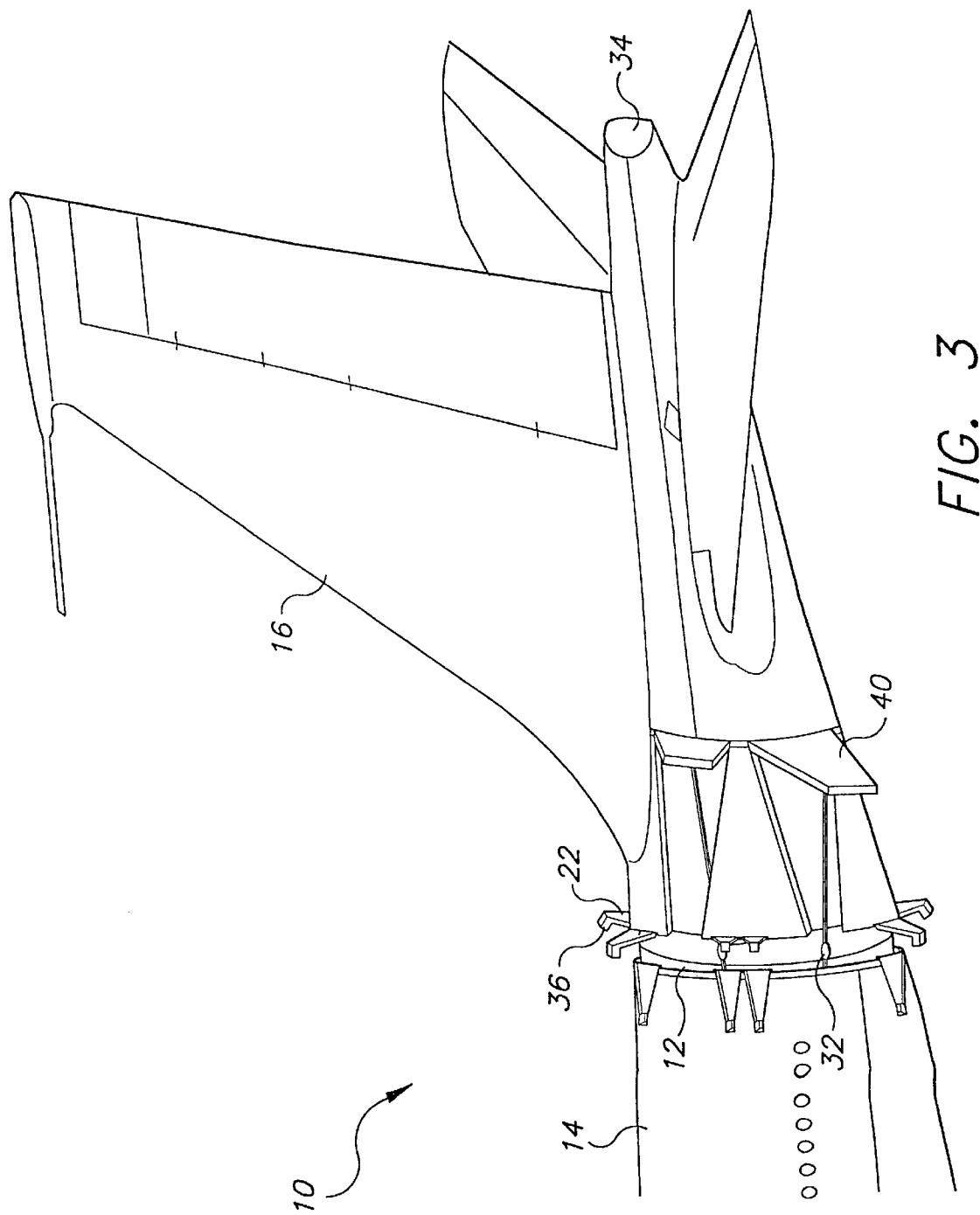
FIG. 3 is an environmental perspective view of the present invention, showing the separation flaps released from the fuselage and the extraction flaps deployed.
Figure 4:
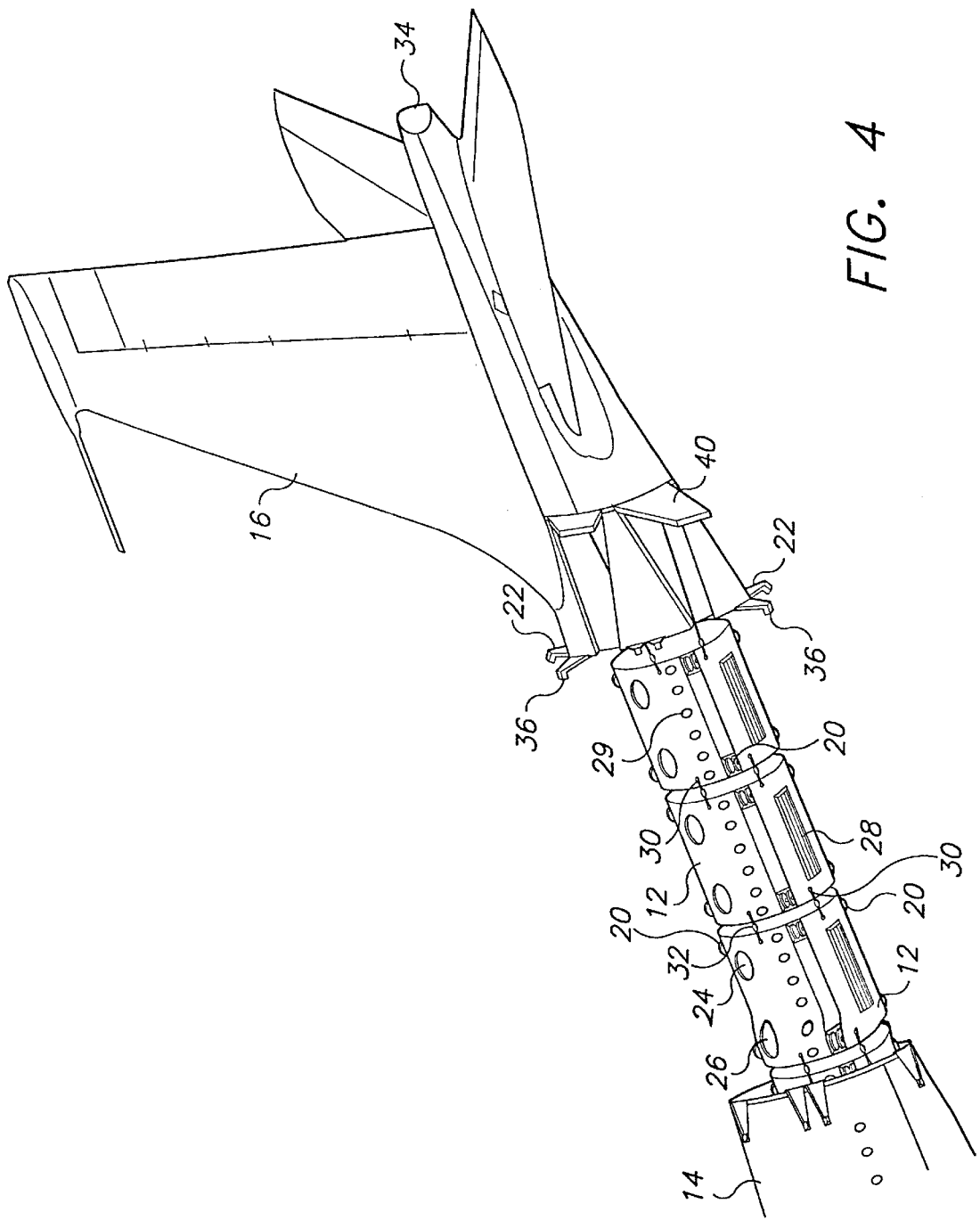
FIG. 4 is an environmental perspective view of the present invention, showing the tail section removing the passenger modules from the fuselage.

Under normal flight conditions, the modules 12 are maintained within the fuselage 14 and are supported by the guide rails 18. Also under normal flight conditions, the tail section 16 is removably attached to the fuselage 14 by four pairs of separation flaps 22 pivotally mounted equidistant about the circumference of the tail section, as shown in FIGS. 2–4, thereby preventing axial displacement of the modules 12. Additionally, four shock-absorbed contact bumpers (not shown) may be pivotally mounted between each passenger module 12 in order to minimize contact between modules.

Each passenger module 12 is equipped with two main parachutes 24 and two auxiliary parachutes 26, shown packed in FIGS. 1 and 4. The auxiliary parachutes 26 deploy in the event that the main parachutes are inoperable. Each passenger module 12 is equipped with a floatation device 28 and although not shown, each module is further equipped with food and water provisions, a homing device, a first-aid kit, a two-way radio, a smoke ventilator and a fire extinguisher.

The passenger modules 12 are connected to one another by swivel connectors 30. Four swivel connectors 30 are equidistantly disposed about the circumference of a pair of modules 12, one end of each swivel connector connected to one module, and another end of each swivel connector connected to another module. Each swivel connector is equipped with an explosive charge 32 directed for downward blasting, so as not to damage a deployed parachute 24, 26. Four equidistantly spaced swivel connectors 30 additionally connect the rearmost passenger module 12 to the tail section 16. The tail section 16 further comprises a wind diffuser 34 to slow the descent of the tail section upon its release from the fuselage 14 relative to the rest of the falling fuselage. The tail section 16 also comprises four extraction flaps 40 pivotally and equidistantly mounted about the circumference of the tail section.

As shown in FIG. 1, present between the foremost passenger compartment 12 and the cockpit section is a firing cable 38 substantially the same length as the fuselage 14 and connected to a spring-loaded detonator. The proximal end of the cable 38 is connected to the foremost section of the fuselage 14, and the distal end of the cable is connected to a high speed winch assembly (not shown) which is in turn connected to the foremost passenger module 12. Under normal flight conditions, the firing cable 38 is substantially coiled about the winch assembly, as the foremost passenger module substantially communicates with the cockpit portion of the fuselage 14.

In the event of an airborne emergency, the aircraft passenger extraction system 10 is activated by the pilot or other crew member, by detonating a series of explosively charged pins (not shown) that secure tail clamps 36 of the separation flaps 22 to the fuselage, and simultaneously activating the homing devices on each module. Once the pins detonate, the separation flaps 22 are released from the fuselage 14 and separation of the tail section from the fuselage is initiated, as shown in FIG. 2. As all passenger modules 12 are interconnected to the tail section 16, the passenger modules begin to move along the rails 18 toward the rear of the fuselage as a result of the separation of the tail section 16. After initial separation of the tail section 16 from the fuselage 14, all extraction flaps 40 extend outward, creating an air braking effect on the tail section and extracting the remaining passenger modules 12 from the fuselage.

When all passenger modules 12 substantially clear the fuselage 14, entirely uncoiling the firing cable 38 from the winch, the fuselage pulls a pin (not shown) on the firing cable due to the momentum of the passenger modules, activating a spring-loaded detonator to separate the passenger modules and tail 16 section. Once the spring-loaded detonator is activated, a firing sequence activates the explosive charges 32 on the swivel connectors 30, beginning with the swivel connectors joining the rearmost passenger module 12 to the tail section 16 and moving forward in sequence to the foremost two passenger modules, thereby separating all passenger modules.

The two main parachutes 24 of each module 12 deploy at approximately the same time as the swivel connectors 30 of each module detonate. The main parachutes 24 are not of uniform size to allow the modules 12 to descend to earth at an angle for a slide landing. If the main parachutes 24 fail to deploy, the auxiliary parachutes 26 are designed to deploy several seconds thereafter. Altitude-monitoring instrumentation (not shown) detects when each module 12 is one-hundred feet from touchdown, and deploys floatation devices 28 to provide buoyancy in the event of an aquatic landing, and cushioning in the event of a dry landing.

It is to be understood that the present invention is not limited to the embodiment described above, but encompasses any and all embodiments within the scope of the following claims.

I claim:

1. An aircraft having a fuselage with a cockpit section at one end and a removable generally cylindrical tail section the other end, said aircraft comprising:

means for removing said tail section from said fuselage;

a rail longitudinally mounted along the inside of said fuselage;

a passenger module for sealingly accommodating at least one passenger and removably disposed within said fuselage, said passenger module comprising:

a plurality of wheels communicating with said rail, thereby allowing said passenger module to move along said rail;

a parachute for opening during emergency conditions to float said module in descent;

a firing cable connected intermediate said passenger module and said cockpit section; and a swivel connector having an explosive charge and connected intermediate said passenger module and said tail section, whereupon removal of said passenger compartment from said fuselage, said firing pin detonates said explosive charge of said swivel connector, thereby releasing said passenger module from said tail section and deploying said parachute.

2. The aircraft according to claim 1, wherein said tail section comprises:

four pairs of separation flaps having a first end and a second end, said first end pivotally mounted about the circumference of said tail section and said second end removably secured to said fuselage of said aircraft, said four pairs of separation flaps equidistantly disposed about the circumference of said tail section; and four extraction flaps pivotally mounted about the circumference of said tail section, each of said extraction flaps mounted intermediate two pairs of separation flaps, said four separation flaps equidistantly disposed about the circumference of said tail section.

3. The aircraft according to claim 2, wherein said means for removing said tail section from said fuselage comprise:

means for releasing said second ends of said pair of separation flaps from said fuselage of said aircraft, thereby releasing said tail section from said fuselage; and means for extending said extraction flaps, thereby creating air-braking force to further separate said tail section from said fuselage and remove said passenger module from said fuselage.

4. The aircraft according to claim 2, wherein said tail section further comprises a wind diffuser to slow the descent of said tail section upon separation of said tail section from said fuselage.

5. The aircraft according to claim 1, wherein said passenger compartment further comprises:

a floatation means for aquatic landings;
   food and water provisions;
   a homing device;
   a first-aid kit;
   a two-way radio;
   smoke ventilation means;
   means for directing an internal bomb blast; and
   fire extinguishing means.

6. An aircraft having a generally cylindrical fuselage with opposed ends, said aircraft comprising:

four rails longitudinally mounted along the inside of said fuselage and equidistantly disposed about the inner circumference of said fuselage;

a cockpit section at one of said ends;

a removable, generally cylindrical tail section at the other of said ends comprising:

four pairs of separation flaps having a first and a second end, said first end pivotally mounted about the circumference of said tail section and said second end removably secured to said fuselage of said aircraft, said four pairs of separation flaps being equidistantly disposed about the outer circumference of said tail section;

four extraction flaps pivotally mounted about the circumference of said tail section, each of said extraction flaps mounted intermediate two pairs of separation flaps and said four extraction flaps equidistantly disposed about the outer circumference of said tail section; and a wind diffuser to slow the descent of said tail section upon separation of said tail section from said fuselage;

means for removing said tail section from said fuselage comprising;

means for releasing said second ends of said pair of separation flaps from said fuselage of said aircraft, thereby releasing said tail section from said fuselage; and means for extending said extraction flaps, thereby creating air-braking force to further separate said tail section from said fuselage;

a plurality of generally cylindrical passenger modules for sealingly accommodating a plurality of passengers, each said module removably disposed within said fuselage and comprising:

four sets of wheels equidistantly disposed about the outer circumference of said passenger module, each said pair communicating with a respective said rail, thereby allowing said passenger module to slidingly move along said four rails;

a main parachute for opening during emergency conditions to float said module in descent;

an auxiliary parachute for opening in the event said main parachute is inoperable;

a floatation means for aquatic landings;
   food and water provisions;
   a homing device;
   a first-aid kit;
   a two-way radio;
   means for directing an internal bomb blast;
   smoke ventilation means; and
   fire extinguishing means;

a firing cable connected intermediate one of said passenger modules and said cockpit section;

a quartet of tail section swivel connectors, each said tail section swivel connector having an explosive charge and mounted generally perpendicular to its adjacent tail section swivel connector, said each swivel connector of said first quartet of swivel connectors connected intermediate said passenger module and said tail section;

a plurality of quartets of module swivel connectors, each said module swivel connector having an explosive charge and mounted generally perpendicular to its adjacent module swivel connector, each of said plurality of quartets of module swivel connectors connected intermediate each of said passenger modules, whereupon the separation of said tail portion from said fuselage, said passenger modules are slidingly withdrawn from said fuselage; and whereupon the clearance of said plurality of passenger modules from said fuselage, said firing pin detonates said explosive charge of said swivel connectors, thereby releasing said plurality of passenger modules from said tail section and from one another, and deploying said parachute.

* * * * *